United States Patent [19]

Shiba et al.

[11] Patent Number: 5,031,058
[45] Date of Patent: Jul. 9, 1991

[54] TAPE CASSETTE LOADING APPARATUS IN WHICH A TRAY IS PROJECTED FROM A TAPE DECK

[75] Inventors: Katsuhiro Shiba; Akiharu Yagi; Wataru Tomikawa, all of Tokorozawa, Japan

[73] Assignee: Pioneer Electronic Corporation, Tokyo, Japan

[21] Appl. No.: 487,573

[22] Filed: Feb. 21, 1990

[30] Foreign Application Priority Data

Jul. 24, 1989 [JP] Japan .................. 1-188722

[51] Int. Cl.⁵ .................. G11B 5/008; G11B 15/00
[52] U.S. Cl. .................. 360/96.5; 360/93
[58] Field of Search .................. 360/96.5, 96.6, 93

[56] References Cited

U.S. PATENT DOCUMENTS 4,761,697  8/1988  Hashiguchi et al. ............ 360/96.5
4,814,911  3/1989  Naoi et al. .................... 360/96.5
4,933,789  6/1990  Ikeda ........................... 360/85
4,935,895  6/1990  Ohyama ........................ 360/96.5
4,951,164  8/1990  Yasaka et al. .................. 360/85

Primary Examiner—A. J. Heinz
Assistant Examiner—Jefferson Evans
Attorney, Agent, or Firm—Sughrue, Mion, Zinn Macpeak & Seas

[57] ABSTRACT

A cassette loading apparatus for a tape deck having a magnetic head includes a tray having a cassette casing for receiving a tape cassette, a movable rack for moving the tray between first and second positions, a mover for moving the cassette casing in a downward direction with respect to the tray, a clamper for pressing down on an upper surface of a cassette contained on the cassette casing when the cassette casing is moved to a downward position, and a cassette pusher for pushing a cassette contained on the cassette casing towards the magnetic head after the cassette casing is moved to the downward position.

10 Claims, 11 Drawing Sheets

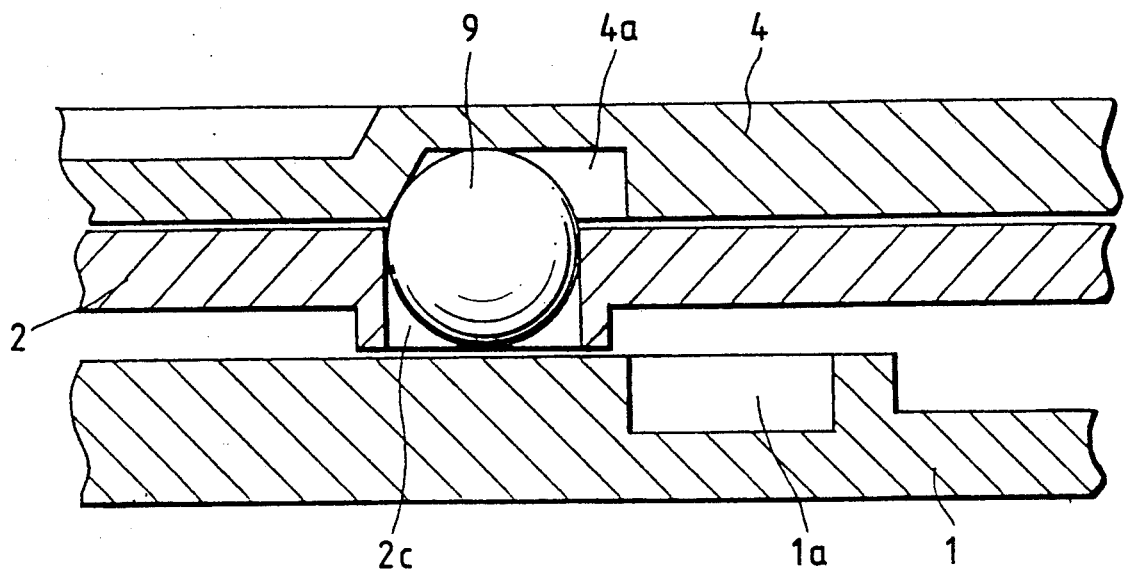
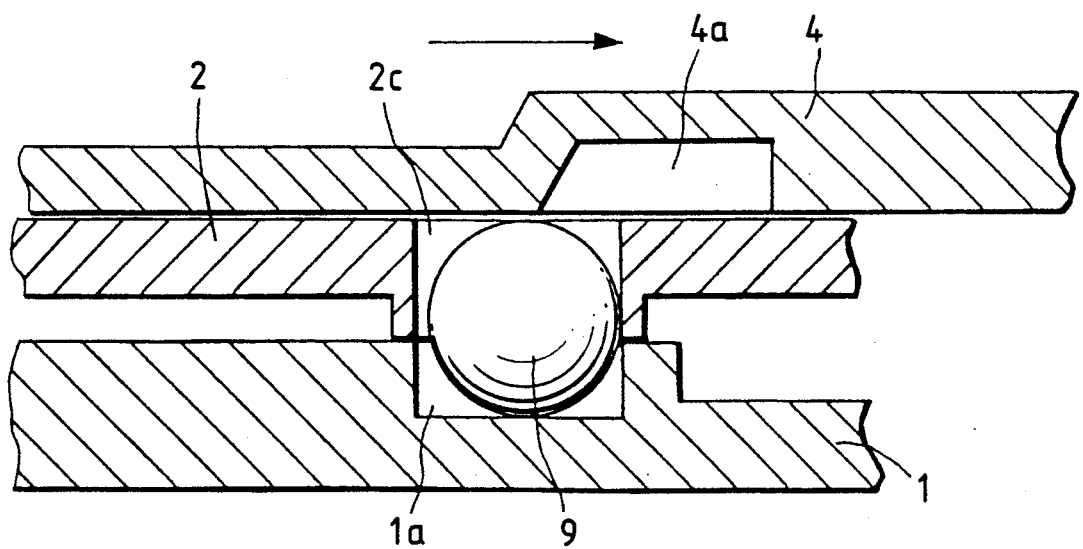

TAPE CASSETTE LOADING APPARATUS IN WHICH A TRAY IS PROJECTED FROM A TAPE DECK

FIELD OF THE INVENTION

The present invention relates to a tape cassette loading apparatus in which when a tape cassette is loaded on a tray projected from a front surface of a tape deck, the tray is drawn into the tape deck so as to set the tape cassette into a tap driving mechanism.

BACKGROUND OF THE INVENTION

As the conventional method of setting an audio tape cassette called a C cassette into a tape deck, the following methods are known.

A first one of those methods is a kangaroo pocket system in which a lower portion of a door having a pocket for receiving a tape cassette inserted therein is pivoted so that when an upper portion of the door is pushed into a tape deck, the tape cassette is set into a tape driving mechanism, the door being opened when an eject button is operated.

A second one of those methods is a linear skating system in which when a front surface door of a tape deck is pushed at a tape running surface side of a tape cassette so that the tape cassette is inserted into the tape deck, a loading apparatus sets the tape cassette into a tape driving mechanism in the tape deck in the same manner as a video tape recorder.

A third one of the methods is a manual operation system in which a cover is provided on a tape cassette loading portion of a tape deck so that a tape cassette is set into a tape driving mechanism by a manual operation after the cover has been opened and thereafter the cover is closed.

Of those foregoing systems, the first kangaroo pocket system has a shortcoming in that the system is unsuitable for miniaturization because the height of a tape deck is increased at least by the depth of a tape cassette and in that wow and flutter performance is deteriorated because of the setting state of the tape cassette in the system.

The second linear skating system has a shortcoming in that since an operational speed is low, dust or trash is apt to enter a mechanical portion such as a tape driving mechanism or the like so as to cause a fault.

Further, the first kangaroo pocket system and the third manual operation system have a shortcoming in that the operation of inserting a tape cassette into a tape deck is troublesome and is poor in feeling.

SUMMARY OF THE INVENTION

The present invention has been developed to solve the foregoing problems associated with the conventional systems for setting a tape cassette into a tape deck, and to provide a tape cassette loading apparatus in which a tray is projected from a front surface of a tape deck through actuation of an operation member such as a switch or the like, and a tape cassette is loaded on a cassette loading portion of the tray so as to cause the loaded tray to set the cassette into a tape driving mechanism through the actuation of the operation member, so that the same set feeling as that in the case of a compact disk can be obtained, and that the cassette is horizontally operated to make it possible to reduce the tape deck in its whole height and to improve the wow and flutter performance.

The present invention relates to means for realizing the tape cassette loading apparatus in which the foregoing objects are attained. The tape cassette loading apparatus is configured such that a motor-driven rack is interlocked with a cassette loading tray in the frontward/rearward direction so that after the tray has been drawn to a predetermined position, a cassette is moved down by cams of the rack, pushed toward a magnetic head by a pusher, and clamped at its upper surface by a clamper.

BRIEF DESCRIPTION OF THE DRAWINGS

FIGS. 7 and 8 are top sectional views showing changes in the interlocked state due to a ball;

DETAILED DESCRIPTION OF THE PREFERRED EMBODIMENT

An embodiment of the present invention will be described with reference to the accompanying drawings.

Referring to FIGS. 1-6, a tray 2 is provided on a chassis 1 of a tape deck so that it can be moved by projecting strip portions 2a in the frontward/rearward direction and so that a cassette loading portion 2b of the tray 2 is projected from a front surface of the tape deck when the tray 2 is moved in the frontward direction while the cassette loading portion 2b is drawn into the tape deck when the tray 2 is moved in the rearward direction.

Figure 1:
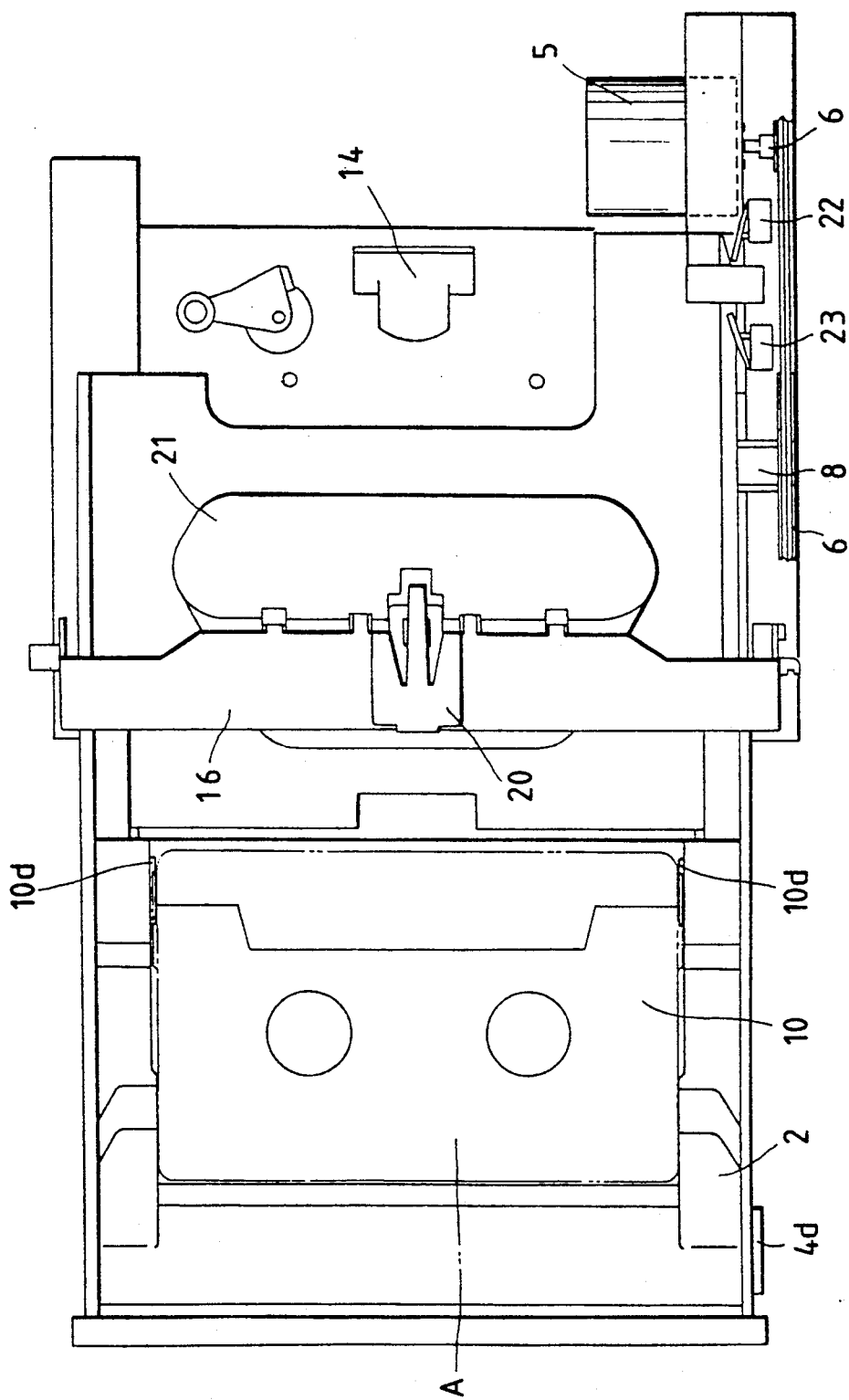
FIG. 1 is a plan view showing the apparatus of the invention.
Figure 2:
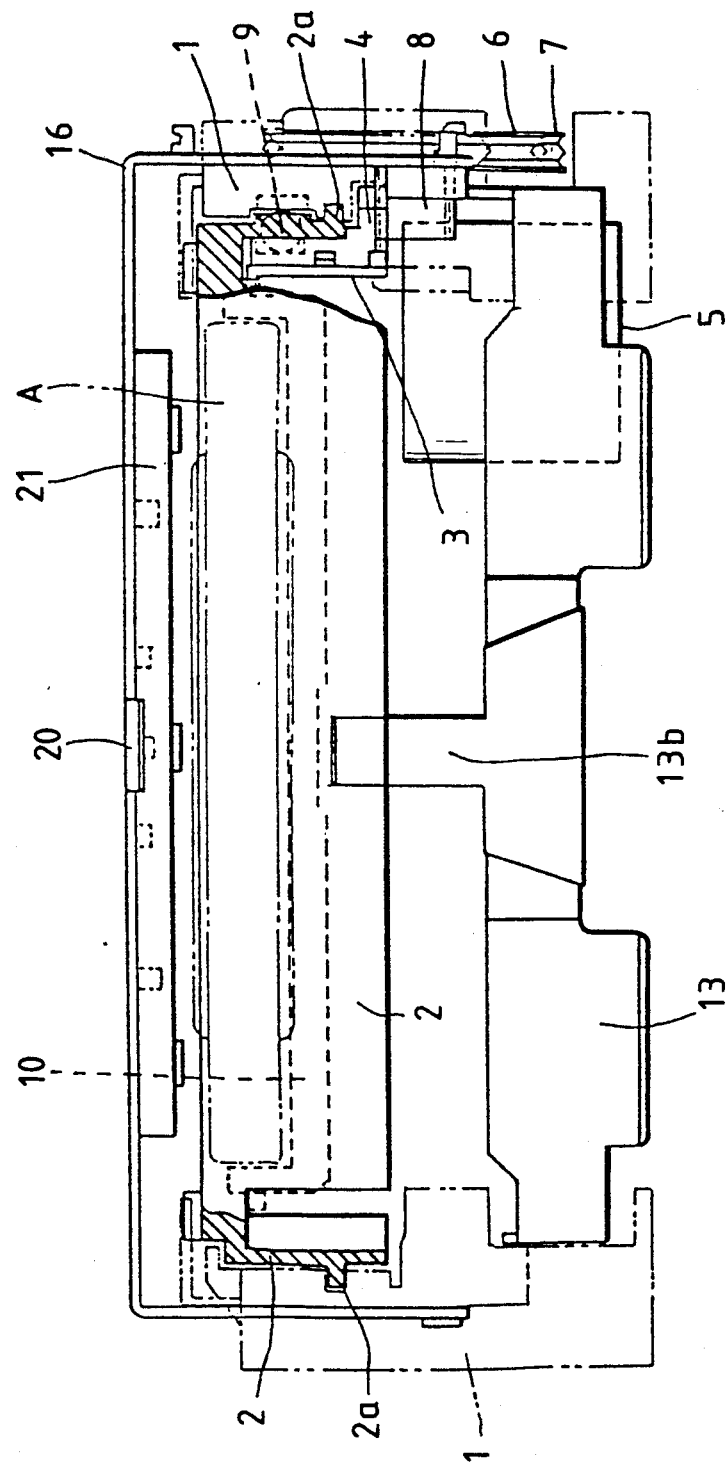
FIG. 2 is a front view.
Figure 3:
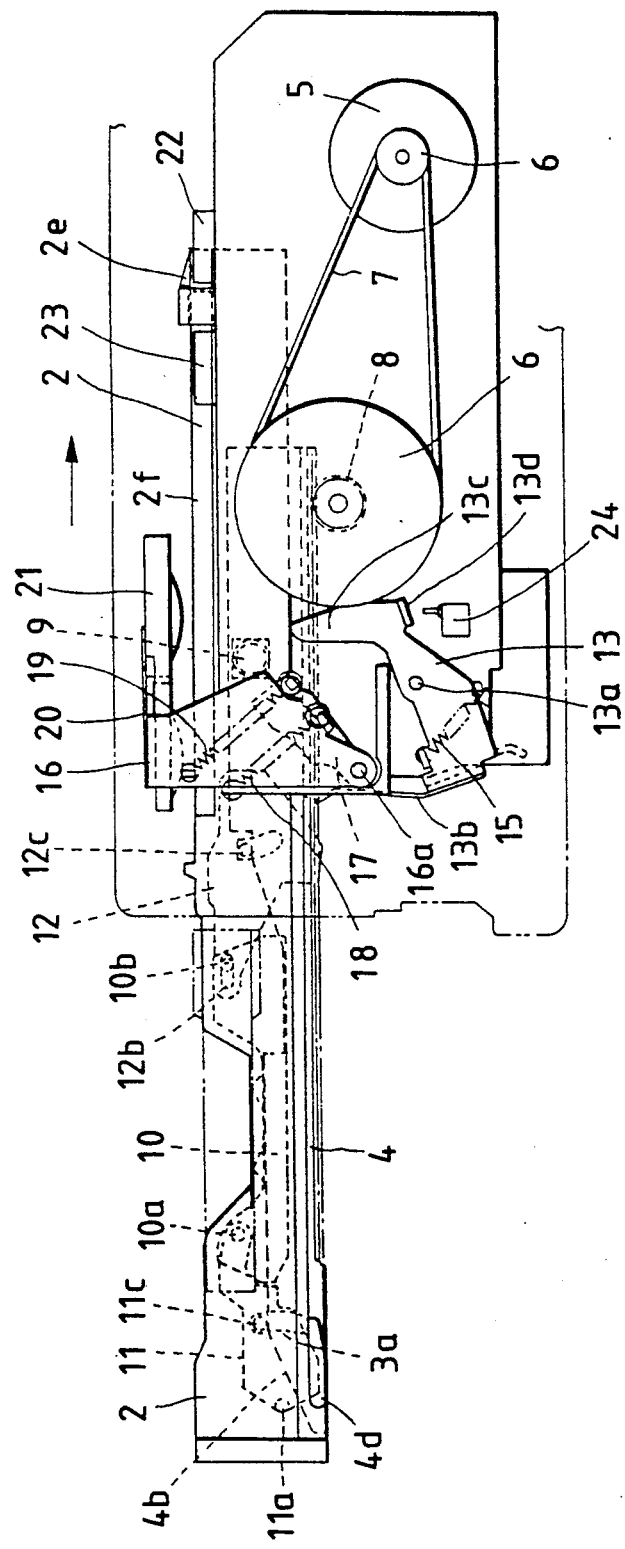
FIG. 3 is a side view showing the tray projected state.

A rack 4 is provided so as to be slidable in the frontward/rearward direction relative to the tray 2 in a gap between an inner chassis 3 fixed on the inside of the tray 2 and one side of the tray 2. As shown in FIG. 3, the rack 4 is meshed with a gear 8 rotated by a driving mechanism constituted by a motor 5, a pulley 6, a belt 7, and the like.

A support hole 2c (FIG. 6) is formed through the tray 2 in a position thereof opposite to the rack 4, and a ball 9 is accommodated in the support hole 2c. The ball 9 is partially projected from the support hole 2c so as to be fitted into either a hollow portion 4a formed in the rack 4 or a hollow portion 1a (FIG. 4) formed in the chassis 1.

Therefore, when the ball 9 is fitted in the hollow portion 1a as shown in FIG. 8, the tray 2 cannot move in the frontward/rearward direction, while the rack 4 can move in the frontward/rearward direction relative to the tray 2. When the ball 9 is fitted in the hollow portion 4a as shown in FIG. 7, on the contrary, the tray 2 can move in the frontward/rearward direction as the rack 4 moves in the frontward/rearward direction.

A cassette casing 10 (FIG. 6) storing a cassette A therein is accommodated in a cassette loading portion 2b of the tray 2, and pins 10a provided on a front portion of the cassette casing 10 are inserted into holes 11b formed through a front support plate 11 pivoted at pins 11a on the tray 2.

Pins 10b provided on a rear portion of the cassette casing 10, on the other hand, are inserted into holes 12b formed through a rear support plate 12 pivoted at its shafts 12a on the tray 2. The cassette casing 10 is moved up/down in the cassette loading portion 2b by rotation of the front and rear support plates 11 and 12.

Respective projections 11c and 12c are provided on the front and rear support plates 11 and 12 so as to be projected through out holes 3a and 3b formed through the inner chassis 3. The projections 11c and 12c are pushed up by cams 4b and 4c formed on the upper surface of the rack 4 respectively as the rack 4 moves in the frontward direction, so that the cassette casing 10 is moved up as the rack 4 moves in the frontward direction.

A rear bottom surface of the cassette casing 10 is formed so as to have inclined surfaces 10c, and projecting strip portions 10d are formed on the rear opposite sides of the cassette casing 10 so as to abut on projecting strip portions $A_1$ (FIG. 9) formed on the opposite sides of the cassette A.

Figure 9:
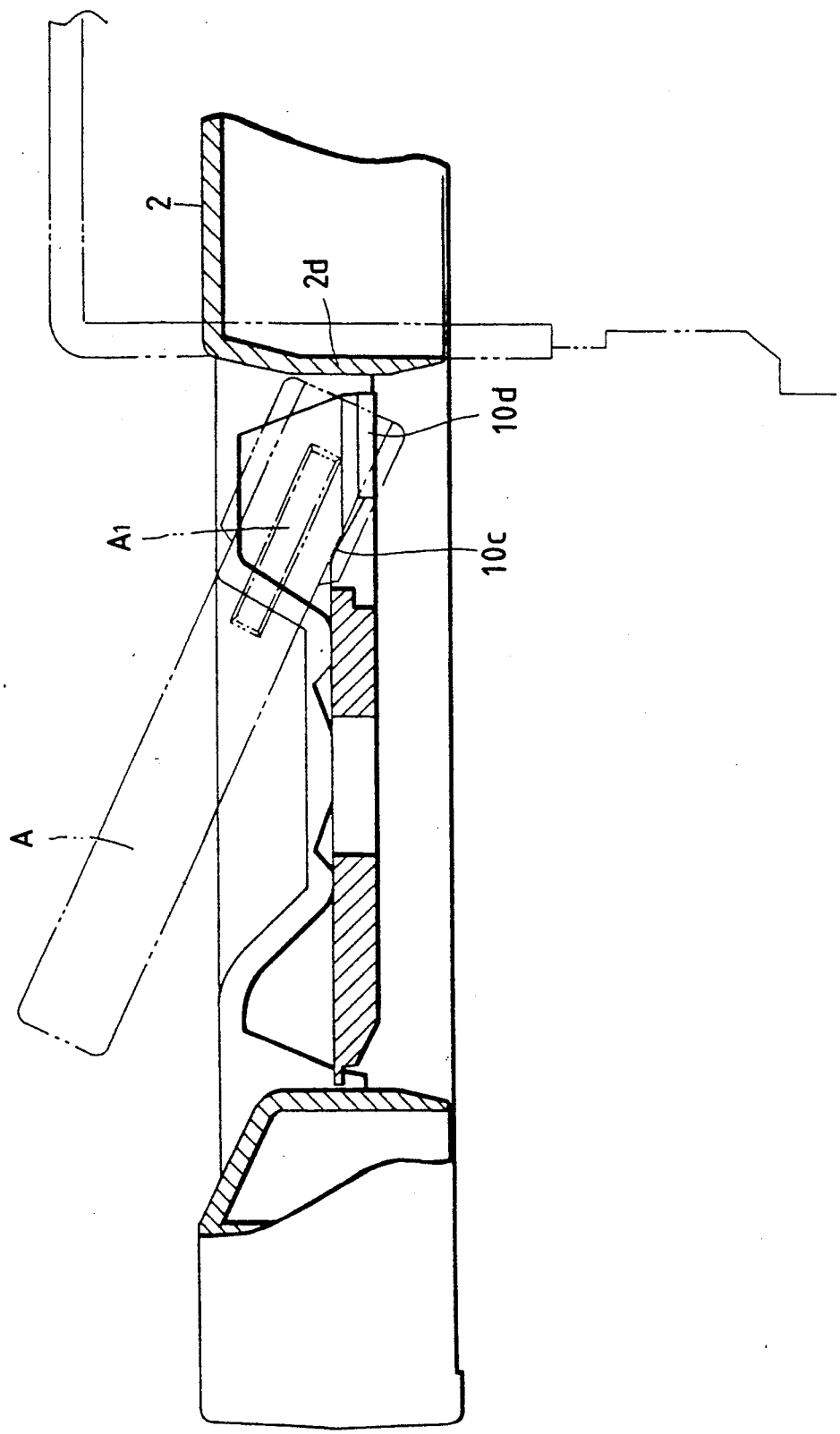
FIG. 9 is a sectional view for explaining the tape cassette inserting step.

Accordingly, when the cassette A is inserted so that the insertion side thereof is made slantingly down as shown in FIG. 9, the projecting strip portions A abut on the projecting strip portions 10d and a front end of the cassette A abuts on a wall surface 2d of the tray 2 so that the cassette A cannot be inserted further.

Accordingly, when the cassette A is released from an operator's hand, the cassette A falls into the cassette casing 10 by its own weight to complete the insertion of the cassette A.

Since the cassette A can be inserted with its insertion side directed slantingly downward as described above, the operator's feeling of insertion is good and the cassette A can be easily taken out when it is to be removed.

Further, a pusher 13 (FIG. 6) is pivoted at its holes 13a on the chassis 1, and a plate spring 13b for pressing the cassette A toward a magnetic head 14 is attached on the pusher 13.

A spring 15 is stretched between the pusher 13 and the chassis 1 so as spring 13b in the direction to make the plate spring 13b come away from the magnetic head 14.

An arm portion 13c of the pusher 13 is pushed by a cam 4d formed on the side surface of the rack 4 so as to rotate against the urging force of the spring 15 so that the plate spring 13b moves toward the magnetic head 14.

Figure 10:
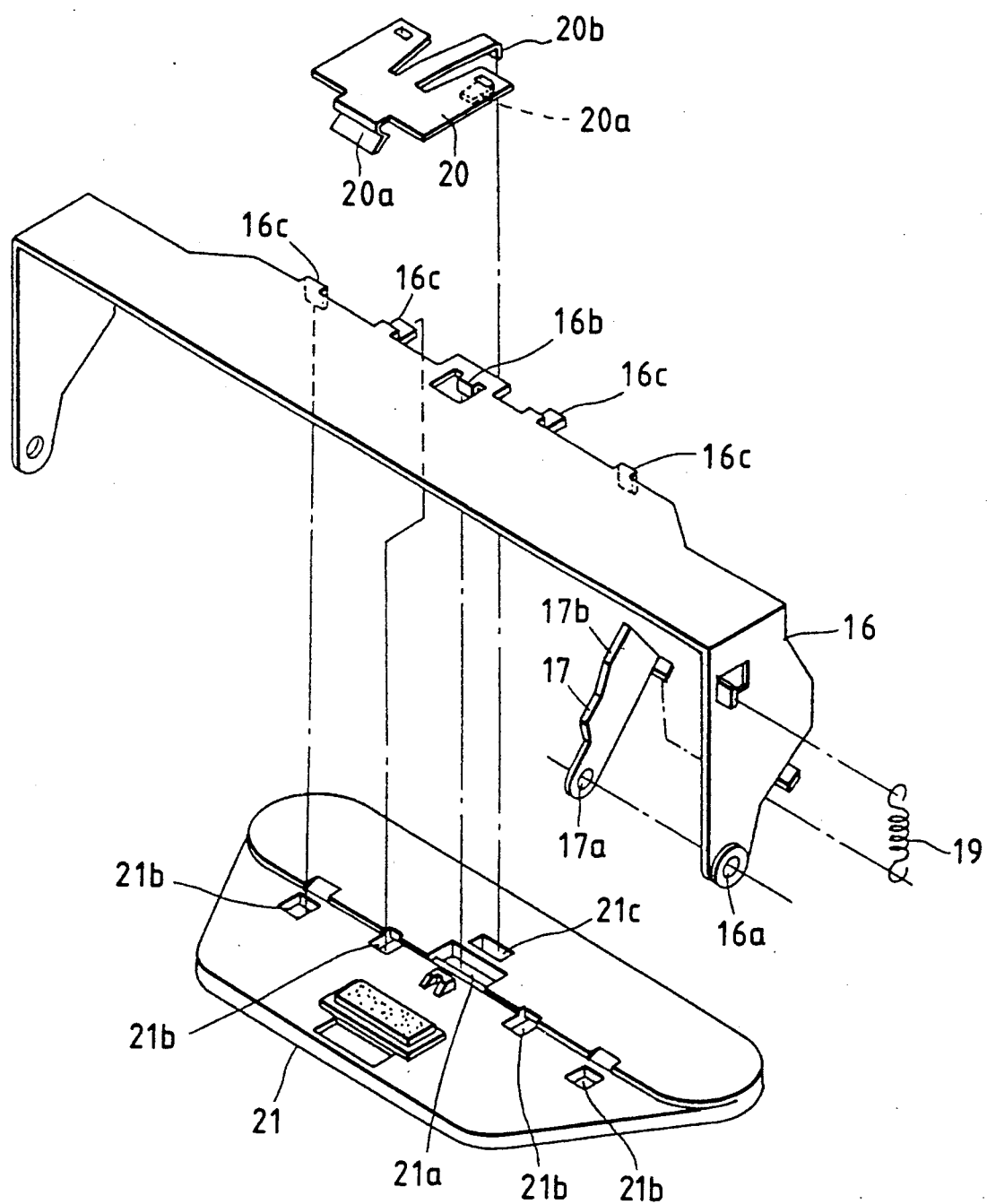
FIG. 10 is an exploded perspective view showing the clamper portion.

Further, a clamper arm 16 (FIG. 10) is pivoted at its holes 16a on the chassis 1 and a sub-arm 17 is pivoted at its hole 17a on one side of the chassis 1. A spring 18 (FIG. 3) is stretched between the clamper arm 16 and the chassis 1, and a spring 19 (FIGS. 3 and 10) is stretched between the clamper arm 16 and the sub-arm 17.

The spring 19 is stronger than the spring 18.

A pressed portion 17b is formed on the sub-arm 17, so that the pressed portion 17b is pushed by the cam 4d formed on the side surface of the rack 4 to make the sub-arm 17 rotate. As the sub-arm 17 rotates, the clamper arm 16 is pulled by the spring 19 so as to rotate against the urging force of the spring 18.

An angle portion 16b and projections 16c are projectingly provided on the clamper arm 16, and a pressing spring 20 (FIG. 3) is attached at its three bent portions 20a on the clamper arm 16.

A half cylindrical portion 21a supported by the angle portion 16b, slot portions 21b into which the projections 16c are inserted, and a hole 21c through which a bent portion 20b formed on the front end of the pressing spring 20 is inserted are formed in a clamper 21 for pushing-down the upper surface of the cassette A.

Figure 11:
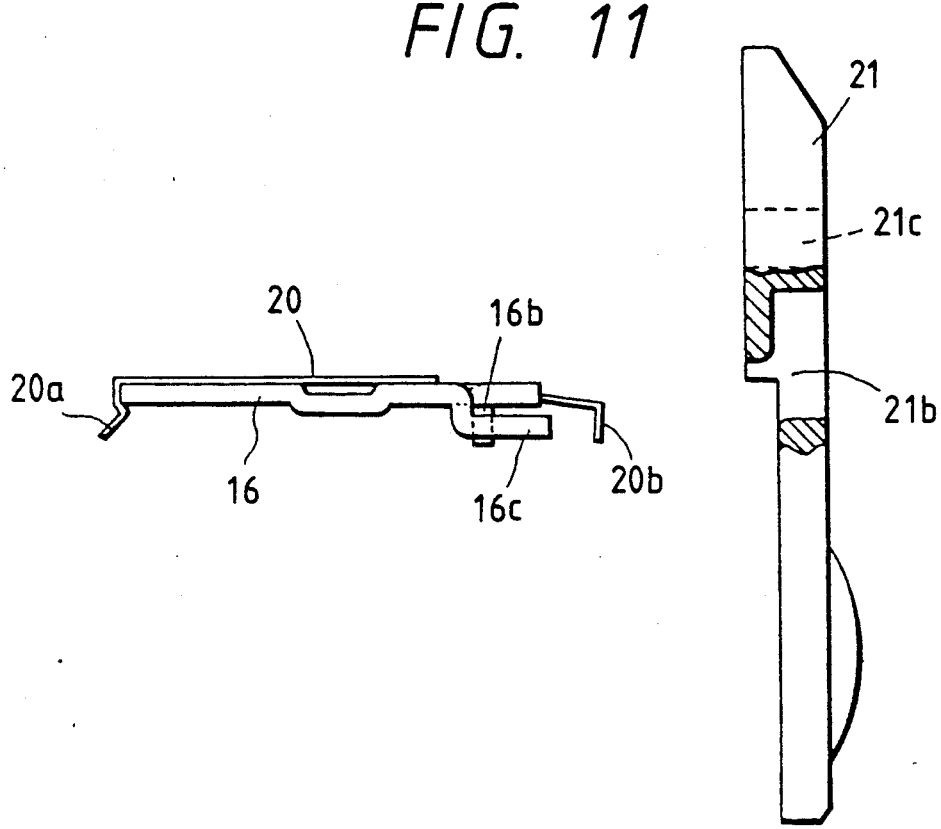
FIGS. 11 and 12 are sectional views showing the order for attaching the clamper on the clamper arm.

In order to attach the clamper 21 on the clamper arm 16, the clamper 21 is made to be perpendicular to the clamper arm 16 as shown in FIG. 11, the half cylindrical portion 21a is fitted into the angle portion 16b, and at the same time the projections 16c are inserted into the slot portions 21b.

Figure 12:
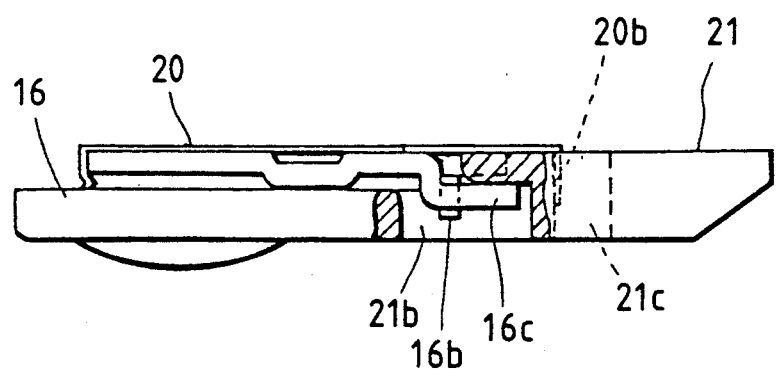

Next, when the clamper 21 is rotated so as to be horizontal to the clamper arm 16 as shown in FIG. 12, the slot portions 21b are made so as not to come out of the projections 16c to thereby complete the attachment of the clamper 21.

Thus, unlike the conventional apparatus, the attachment between the clamper 21 and the clamper arm 16 is performed without using any supporting shaft and any stopper therefor. That is, the clamper 21 is attached on the clamper arm 16 so as to be rotatable in the direction that the clamper 21 further rotates with respect to the clamper arm 16.

Figure 6:
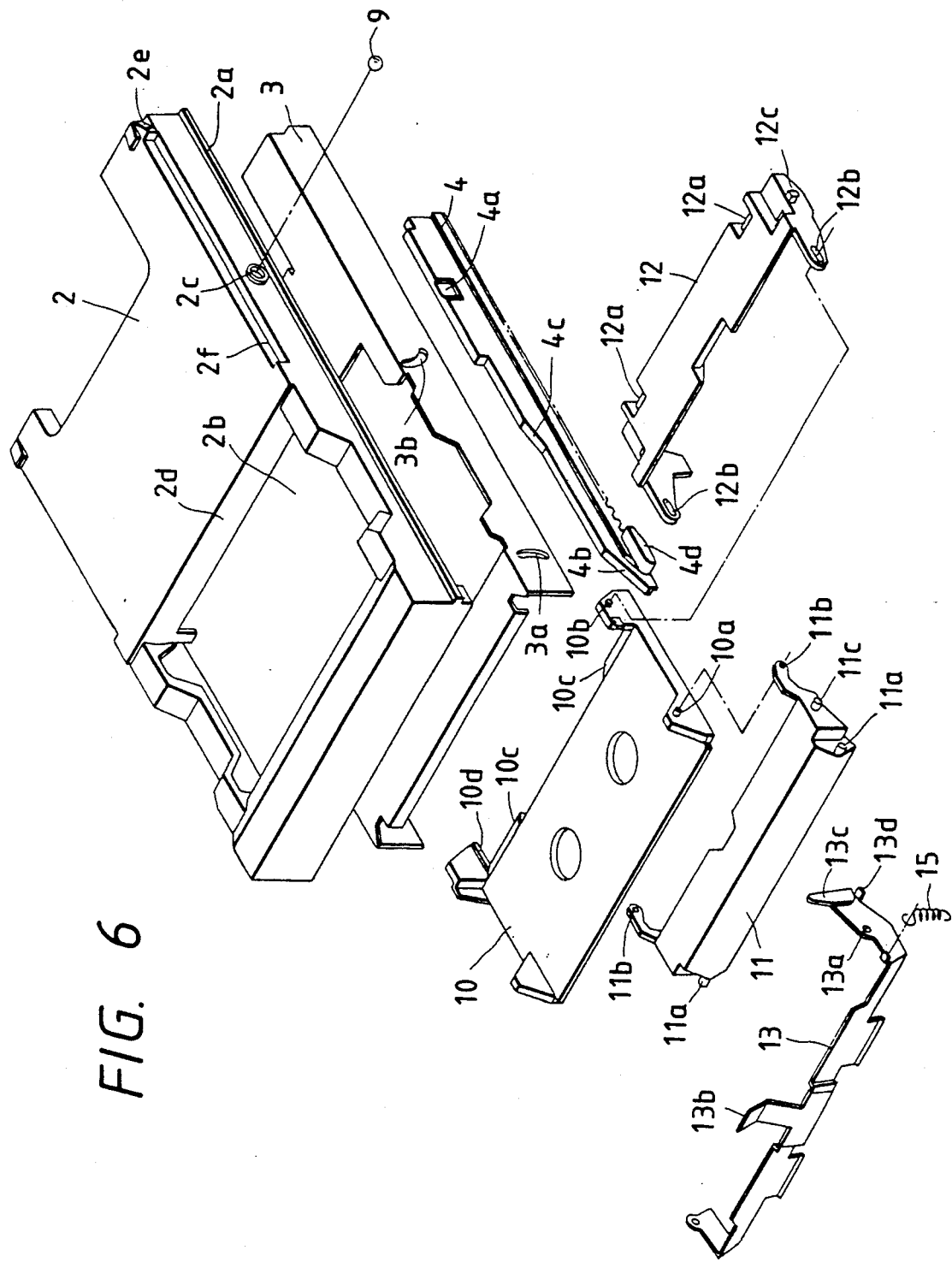
FIG. 6 is a perspective view showing the exploded state.

Further, referring to FIG. 6, a slot portion 2e and a cam surface 2f are provided in an upper side portion of the tray 2. As shown in FIG. 3, when the tray 2 is projected to its uppermost position, the cam surface 2f actuates a switch 22 attached on the chassis 1.

When the tray 2 is drawn to its rearmost portion and the ball 9 is fitted into the hollow portion 1a, an end of the slot portion 2e actuates a switch 23 attached on the chassis 1.

When the pusher 13 is pushed by the cam 4d of the side surface of the rack 4 so as to rotate, the plate spring 13b pushes the cassette A toward the magnetic head 14, the pressing portion 13d of the pusher 13 actuates a switch 24 attached on the chassis 1 to operate.

Figure 13:
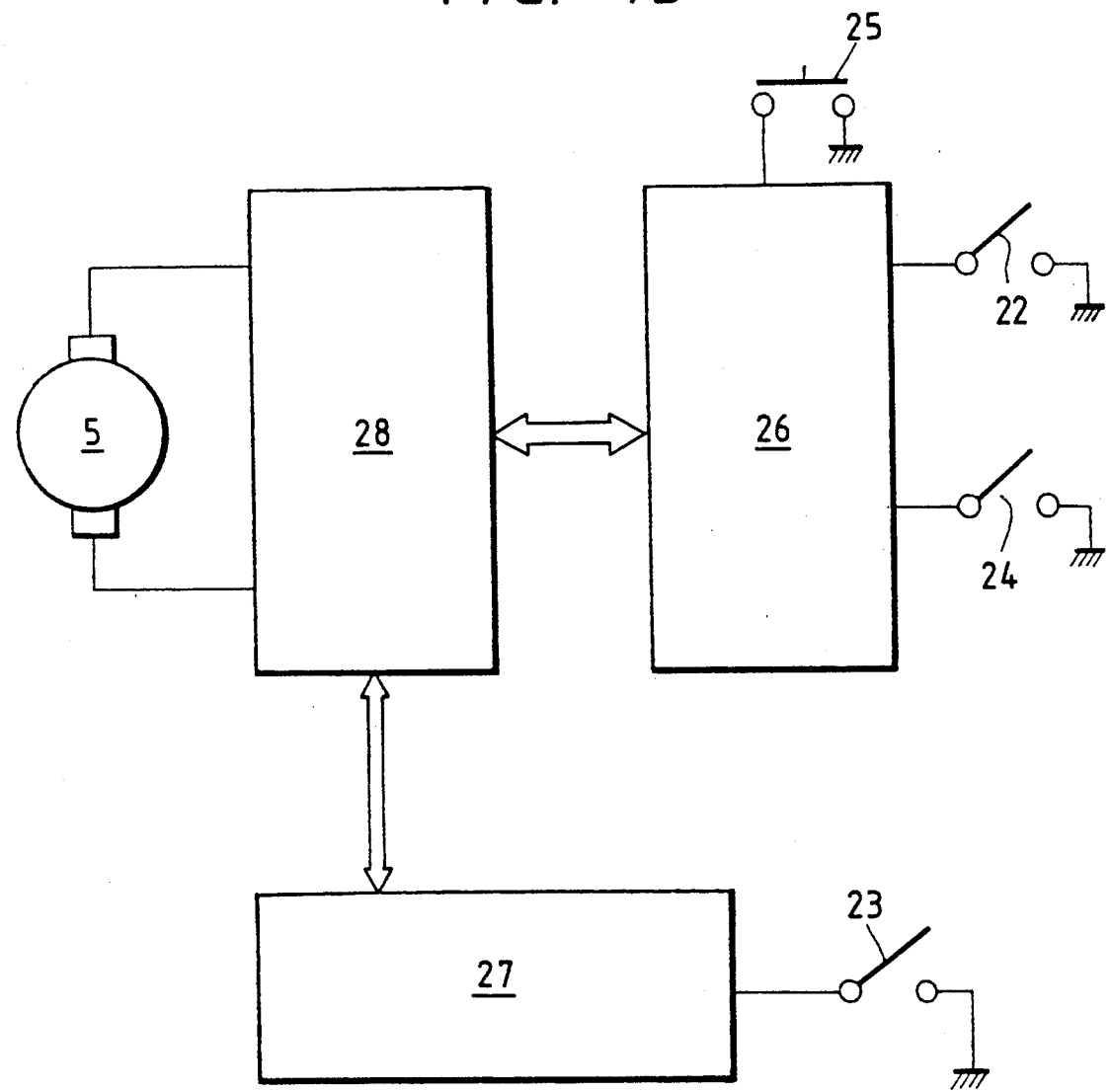
FIG. 13 is a circuit block diagram for explaining the control of the motor.

Rotation of the foregoing motor 5 is controlled by a drive circuit 28 controlled by a control circuit 26 operated by switches 22 and 24 and a manually-operated switch 25 as well as a speed control circuit 27 operated by a switch 23, as shown in FIG. 13.

Next, the operation of this tape cassette loading apparatus from the tray projected state of FIG. 3 will be described.

First, the tape cassette A is mounted on the cassette casing 10 as shown in FIG. 9 in a manner as described above, and the cassette is released from the operator's hand so that the cassette A is made to be in a horizontal state. Thereafter, the switch 25 (FIG. 13) is operated.

Then, the drive circuit 28 (FIG. 13) controlled by the control circuit 26 supplies the motor 5 with a current so as to rotate the motor 5, and the rotation of the motor 5 is transmitted to the gear 8 so that the rack 4 starts to move in the direction of an arrow of FIG. 3.

At this point of time, since the ball 9 in the tray 2 is fitted in the hollow portion 4a of the rack 4, the rack 4 and the tray 2 are in the engaged state so that the tray 2 moves together with the rack 4 in the direction of the arrow of FIG. 3.

Figure 4:
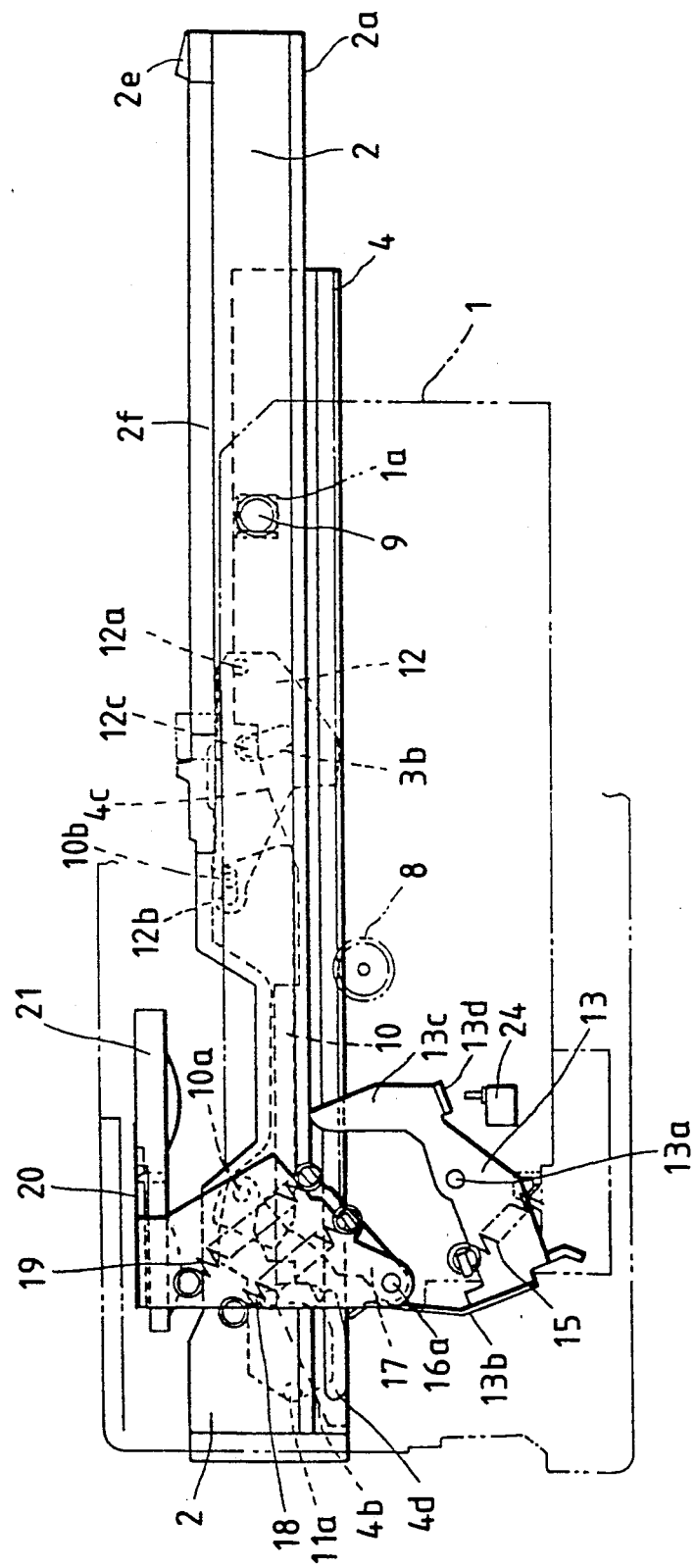
FIG. 4 is a side view showing the tray drawn state.

When the tray 2 moves together with the rack 4 to the position of FIG. 4, the switch 23 is operated by the end of the slot portion 2f, and the ball 9 is fitted into the hollow portion 1a of the chassis 1 so as to come out of the hollow portion 4a. As a result, the engagement between the tray 2 and the rack 4 is released, and the tray 2 stops at the position of FIG. 4.

When the switch 23 is operated, the speed control circuit 27 controls the drive circuit 28 so as to lower the voltage to be applied to the motor 5, thereby decelerating the motor 5.

The movement of the rack 4 is continued by the decelerated rotation of the motor 5 so that the cams 4b and 4c of the rack 4 come out from the under of the small projections 11c and 12c. Therefore, the front and rear support plates 11 and 12 rotate downward about the pin 11a and the shaft 12a respectively so that the cassette casing 10 comes down relative to the tray 2, as shown in FIG. 5.

At this time, the cassette casing 10 has been moved under the clamper 21 by the foregoing movement of the tray 2. Then, the sub-arm 17 is pushed by the cam 4d so as to rotate as shown in FIG. 5 and the clamper arm 16 is rotated by the spring 19 so that the clamper 21 comes down so as to be pressed against the upper surface of the cassette A.

Figure 5:
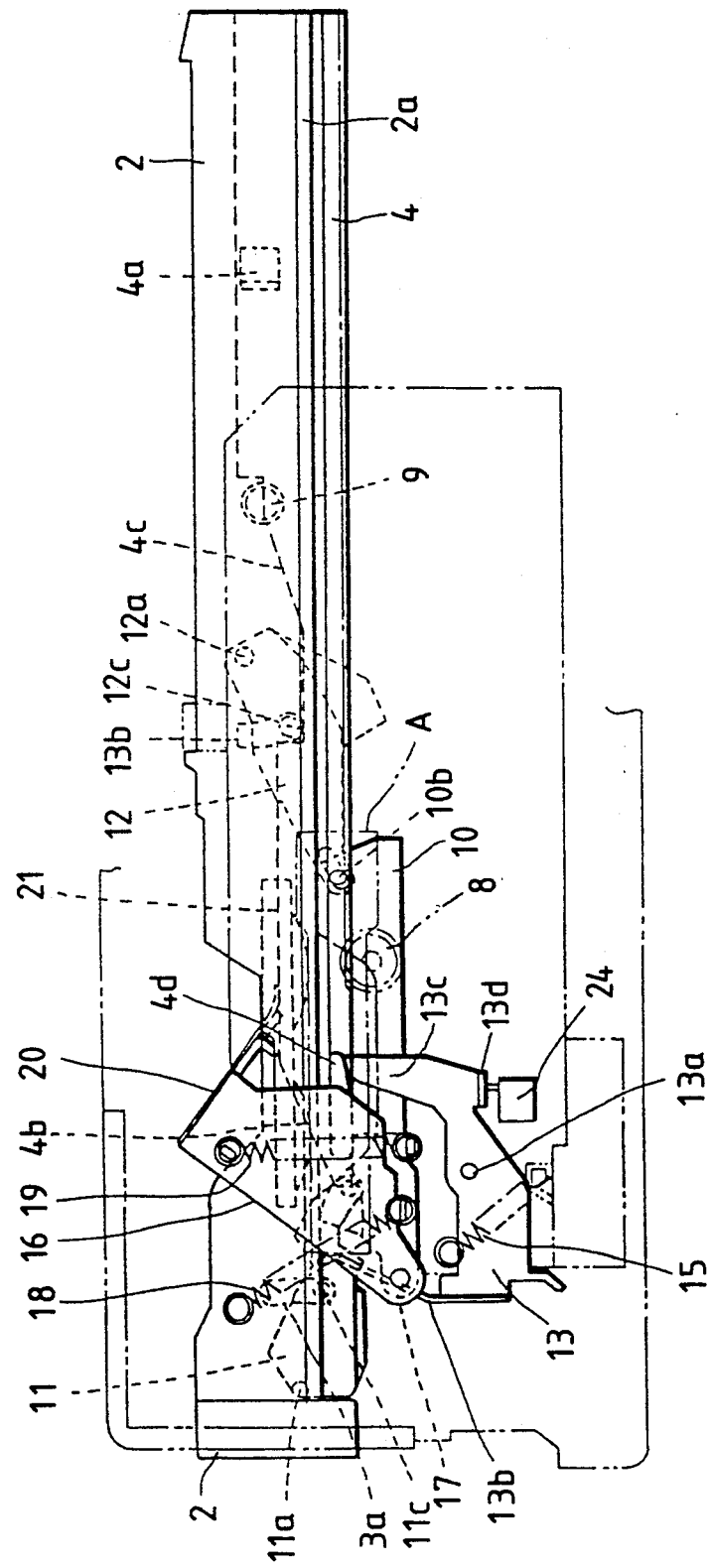
FIG. 5 is a side view showing the cassette casing descended state.

When the clamper 21 is pressed against the upper surface of the cassette A, the clamper 21 rotates about the half cylindrical portion 21a so as to be kept in the horizontal state, so that the pressing spring 20 is bent as shown in FIG. 5 so as to be urged in the direction for pushing-down the cassette A.

At the same time, the cam 4d of the rack 4 pushes the arm portion 13c of the pusher 13 to rotate the pusher 13 against the spring 15 as shown in FIG. 5, so that the cassette A is pressed toward the magnetic head 14 (FIG. 1) by the plate spring 13b of the pusher 13.

By the rotation of the pusher 13, the pressing portion 13d of the pusher 13 actuates the switch 24 to operate so that the control circuit 26 controls the drive circuit 28 so as to cutoff a current to the motor 5 to stop the rotation of the motor 5 to complete the loading of the cassette A.

The reason why the speed of a series of operations following the coming-down of the cassette casing 10 is reduced by reduction of the rotational speed of the motor 5 is that the operation in the coming-down is made sure and noises are prevented from occurring in the coming-down. Conventionally, this operation has been performed mechanically.

That is, in the case of performing the operation by using a cam, the operation distance of the cam is so long because of the gentle inclination of the cam that miniaturization is obstructed.

Further, in the case where the operation is to be performed by changing-over a mechanism, the mechanism is so complicated and the number of parts is so increased that cost-up is caused.

If the operation is to be performed by deceleration of the motor 5, on the other hand, it is not necessary to provide a mechanism for the operation, and not only the miniaturization of the tape deck, the cost-down due to simplification of the mechanism, and the improvement in reliability can be attained but the operational speed of the tray 2 can be made high.

When the cassette A is to be ejected, on the other hand, the switch 25 is operated to perform an operation reverse to the foregoing one that is, the cassette A is made free in the cassette casing 10, the cassette casing 10 is moved up, and the tray 2 is moved in the frontward direction, so that the cassette casing 10 is in the state where it is projected from the front surface of the tape deck as shown in FIG. 3.

At this time, the switch 22 is operated by the cams 2e of the tray 2 so that the drive circuit 28 cuts off the current to the motor 5 to stop the motor 5 under the control of the control circuit 26 to complete the ejecting operation.

As described above, according to the present invention, the tray having the cassette casing carrying a tape cassette mounted thereon is drawn into the deck by the operation of the rack, the cassette casing is moved down, and then the tape cassette is pushed down by the clamper and pressed toward the magnetic head by the pusher.

Therefore, the situation that the tape cassette is set into the tape deck so as to be loaded can be made to closely resemble the situation of setting and loading of a disk such as a compact disk, a video disk, or the like on a player, and therefore it is possible to obtain a feeling which has not been obtained in the conventional tape deck.

Further, since the tape cassette is horizontally set into the tape deck by the foregoing loading, it is possible to prevent deterioration of wow and flutter performance in reproduction of a tape by uniformity of the weight of the tape cassette on a tape reel or the like.

What is claimed is:
1. A tape cassette loading apparatus for a tape deck having a magnetic head, comprising:
   a tray including a cassette casing for receiving a tape cassette, said cassette casing being movably mounted on said tray, said tray being movable between a first position in which said cassette casing projects from the tape deck and a second position in which said cassette casing is disposed within the tape deck;
   a movable rack for moving said tray between the first and second positions, said movable rack being coupled to said tray so as to move said tray between said first and second positions, and said movable rack being uncoupled from said tray at the second position so that said movable rack can move further into the tape deck relative to said tray;
   means, engaging said movable rack, for permitting said cassette casing to move in a downward direction towards the magnetic head, with respect to said tray, to a downward position after said movable rack is uncoupled from said tray at the second position and said movable rack moves further into the tape deck;
   a clamper operable for pressing-down on an upper surface of a cassette contained on said cassette casing, said clamper being operated by contacting said movable rack as said movable rack moves further into the tape deck relative to said tray and after said cassette casing is moved to the downward position; and
   a cassette pusher operable for pushing a cassette contained on said cassette casing towards the magnetic head of the tape deck, said cassette pusher being operated by contacting said movable rack as said movable rack moves further into the tape deck relative to said tray and after said cassette casing is moved to the downward position towards the magnetic head.

2. The cassette loading apparatus as defined in claim 1, further comprising motor means for supplying power to said movable rack.

3. The cassette loading apparatus as defined in claim 2, wherein said motor means comprises a motor and a gear connected between said motor and said movable rack.

4. The cassette loading apparatus as defined in claim 2, wherein said motor means includes switching means switchable between first and second states, said motor means reducing the power supplied to said movable rack when said switching means switches to the second state.

5. The cassette loading apparatus as defined in claim 4, wherein said tray contacts said switching means to switch to the second state after said tray is moved to the second position.

6. The cassette loading apparatus as defined in claim 2, wherein said means for moving said cassette casing downward includes support plates.

7. The cassette loading apparatus as defined in claim 6, wherein said rack includes a cam surface and wherein said support plates include respective projections which slide on said cam surface as said movable rack moves.

8. The cassette loading apparatus as defined in claim 7, wherein the cam surface of said movable rack has inclined portions such that when the projections of said support plates slide down on the inclined portions, said cassette casing moves down towards the downward position.

9. The cassette loading apparatus as defined in claim 1, wherein said pusher includes an operating arm portion and said movable rack includes an engaging member, said engaging member contacting the operating arm portion of said pusher when said cassette casing is moved to the downward position to operate said cassette pusher.

10. The cassette loading apparatus as defined in claim 1, wherein said clamper includes a pressed portion and said rack includes an engaging member, said engaging member contacting said pressed portion when said cassette casing is moved to the downward position to operate said clamper.

* * * * *